Jan. 5, 1965  V. A. JUENGEL  3,164,245
CONVEYOR
Filed March 25, 1960  2 Sheets-Sheet 2
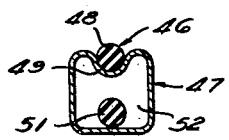
Fig. 9
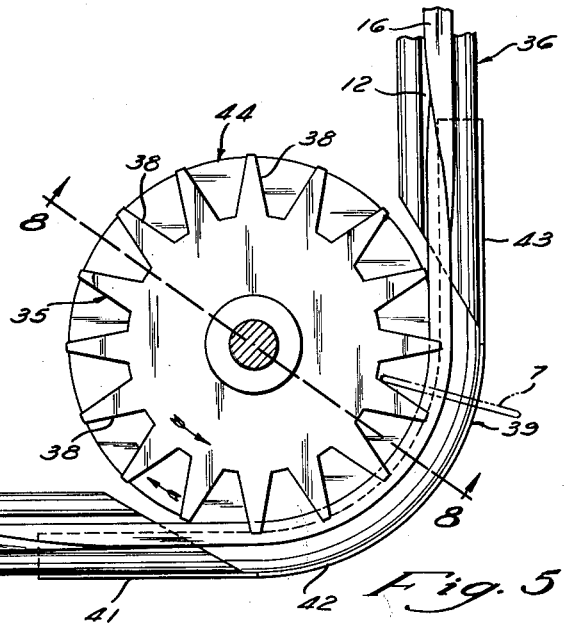
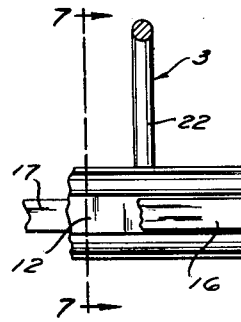
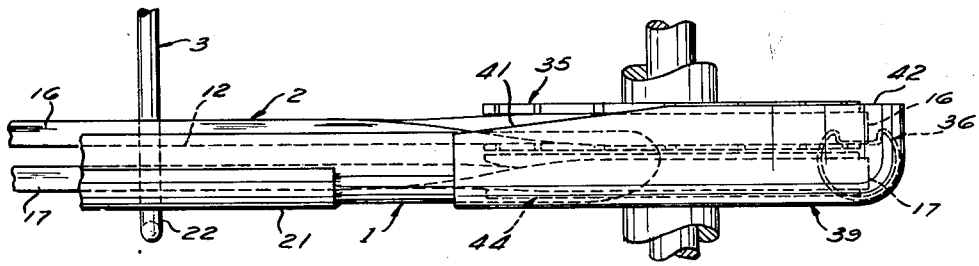
Fig. 5
Fig. 6
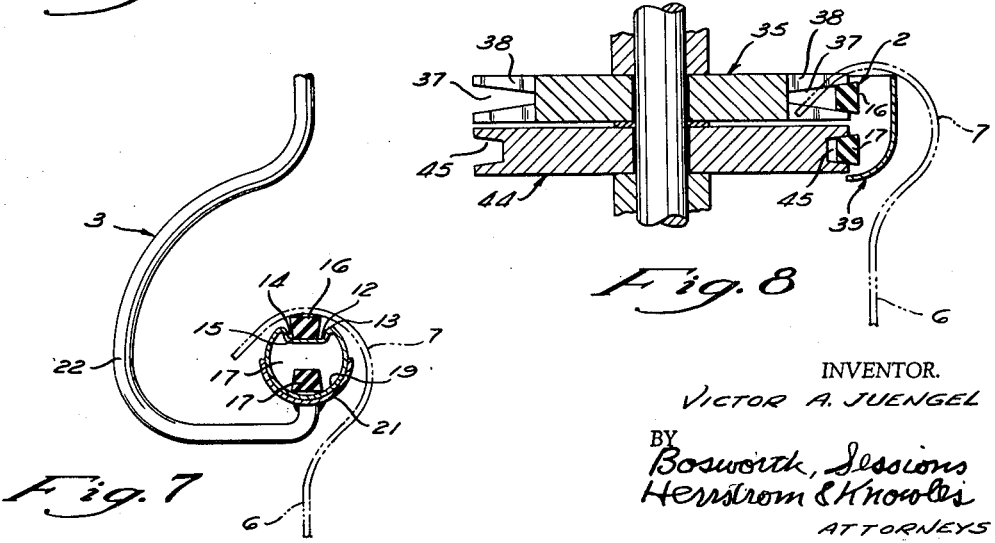
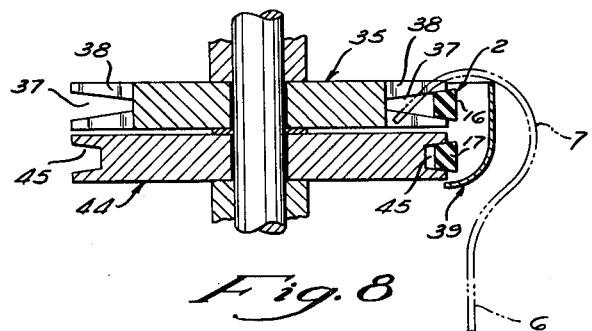
Fig. 8
Fig. 7
INVENTOR.
VICTOR A. JUENGEL
BY Bosworth, Sessions
Herrstrom & Knowles
ATTORNEYS United States Patent Office 3,164,245
Patented Jan. 5, 1965

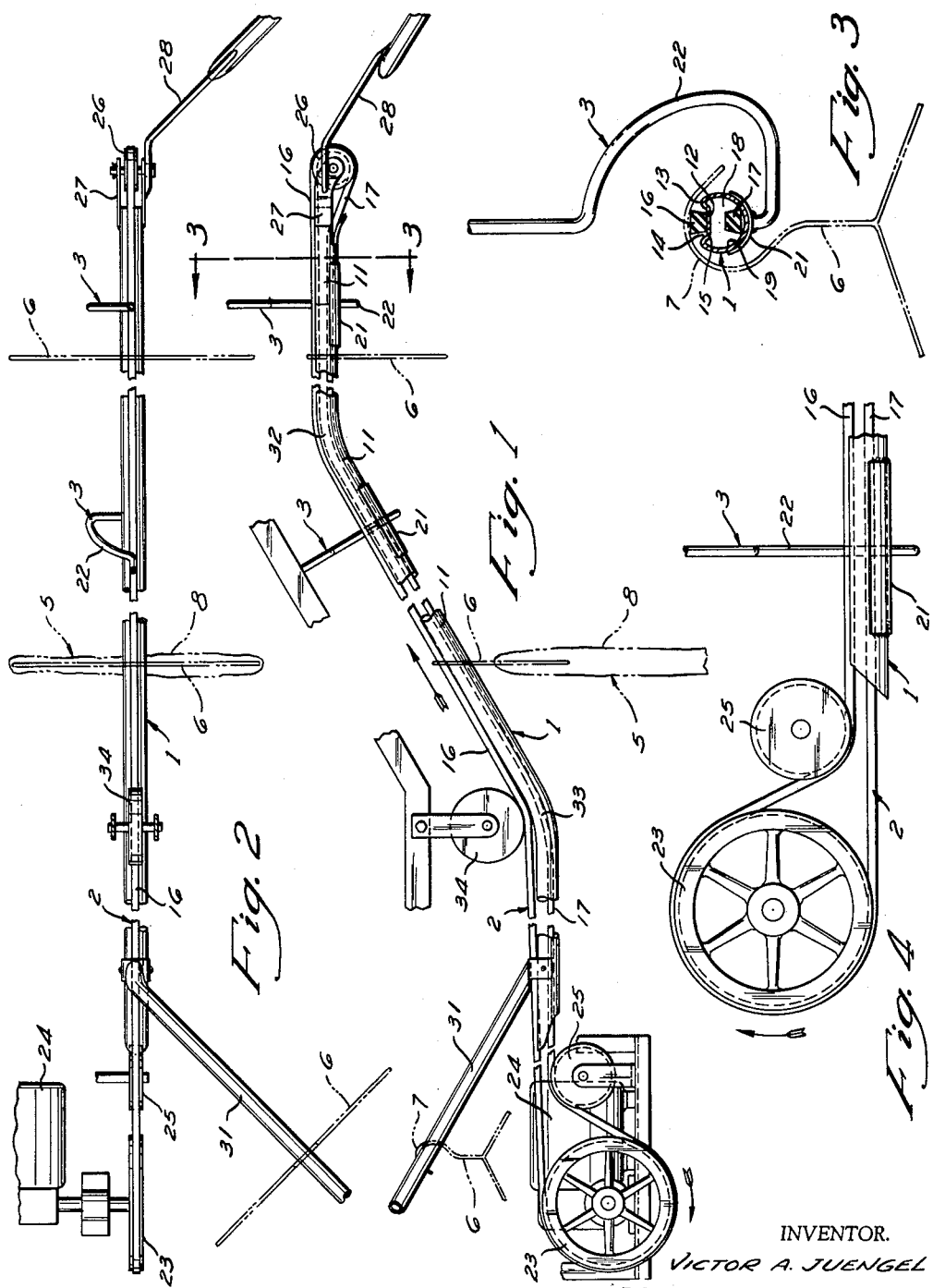

3,164,245
CONVEYOR
Victor A. Juengel, Middleburg Heights, Ohio, assignor to Juengel V-Matic Systems, Inc., Cleveland, Ohio, a corporation of Ohio
Filed Mar. 25, 1960, Ser. No. 17,528
1 Claim. (Cl. 198—129)

This invention relates to conveyors, and more particularly to conveyors of the type comprising an endless belt which conveys or moves the articles to be transported.

While conveyors embodying the invention may be employed for a wide variety of purposes, the invention will be discussed primarily in connection with the transportation of garments on clothes hangers, referred to for convenience as "hanger goods," in which service the invention provides exceptional advantages.

Such service involves numerous stringent requirements which should be met if a conveyor is to be fully satisfactory. A conveyor for handling such hanger goods should not soil the garments during loading of the goods on, transportation of the goods by, and unloading of the goods from the conveyor, because of the high costs of specially handling and cleaning the garments. The conveyor should permit the goods to be easily and quickly loaded on and unloaded from the conveyor by simple operations to permit rapid and efficient manual handling of the goods or to make possible the use of automatic equipment for loading and unloading the conveyor. The conveyor should be such that its belt can travel horizontally and at substantial inclinations to the horizontal, and also in turns of 90° or more substantially in the plane of travel of the goods while the belt is carrying the goods; this is desirable to permit installations satisfying all service conditions and location requirements likely to be encountered. The conveyor should be capable of installation and operation in a wide range of lengths, ranging from a few feet to 300 feet or more. It should be of light weight, and be simple and easy to install, particularly if it is to be used in existing plants or warehouses. The conveyor should have low power requirements when under load and when not under load, since in many cases its belt will travel for long periods or continuously. It should be capable of supporting and conveying substantial loads, particularly those comprising large numbers of items. It should be durable and have long service life with a minimum of maintenance and little if any lubrication. The conveyor should provide these and other advantages at the lowest possible cost of manufacture and installation.

Prior conveyors fail to satisfy many if not most of these requirements. Most of them comprise a large number of moving parts which require frequent lubrication and other substantial maintenance; this not only involves substantial costs, but also increasses the possibilities of soiling the garments because of dust, dirt or dripping lubricant. Prior conveyors usually embody spaced hooks or the like on which the hangers of the hanger goods must be hung when the goods are loaded on the conveyor, and from which the hangers must be detached when the goods are unloaded, which operations are not only time-consuming if performed manually, but also introduce considerable complexities if it is attempted to perform them automatically. It is, moreover, difficult or impossible to install many of the prior conveyors so that the path of travel of the belt may change from the horizontal to an upwardly or downwardly inclined angle or vice-versa, or so it may turn at an angle of 90° or more in the plane of travel of the goods. Furthermore, the maximum lengths of prior conveyors are quite limited, due primarily to the weight of the moving parts and the power required to move them even when not under load. These factors also limit the loads which can be transported by the conveyor. The weight and friction of the moving parts of the conveyor also require relatively high power to drive the conveyor, which is exceptionally disadvantageous when the conveyor is operating continuously. Because of their weight and complexity, many prior conveyors are quite difficult to install, which makes them particularly disadvantageous for use in existing structures. Moreover, they are usually expensive to manufacture and install, and often do not have the long service life and durability which are desirable.

A general object of the present invention is the provision of conveyors which satisfy all of the requirements outlined above, as well as providing other advantages. Another object is to provide conveyors which overcome the deficiencies outlined above, as well as others, of prior conveyors. It is another object of this invention to provide such conveyors which can be made of long lengths, which can provide paths of belt travel which are generally horizontal or which incline upwardly or downwardly at substantial angles, or which turn sharply substantially in the plane of travel of the goods while conveying the goods. Another object is to provide such conveyors which can operate for long periods with little or no maintenance and no belt lubrication, which can transport substantial loads, and which have low power requirements whether loaded or unloaded. A further object is the provision of such conveyors which are of light weight and which are simple and inexpensive to manufacture and to install in existing or new plants or warehouses.

Futher objects and advantages of the invention will become apparent from the following description of preferred forms thereof, reference being made to the accompanying drawings in which:

FIGURE 1 is a side elevation of a conveyor embodying the invention, as adapted for the transportation of hanger goods;

FIGURE 2 is a plan of the conveyor of FIGURE 1;

FIGURE 3 is a sectional elevation, along line 3—3 of FIGURE 1, showing a support for the conveyor of FIGURES 1 and 2;

FIGURE 4 is a side elevation of a portion of another conveyor embodying the invention, showing an alternative arrangement of the driving sprocket and guide pulley;

FIGURE 5 is a plan of a portion of another conveyor embodying the invention adapted to make a 90° turn substantially in the plane of travel of the goods;

FIGURE 6 is a side elevation of the conveyor of FIGURE 5;

FIGURE 7 is a sectional elevation along line 7—7 of FIGURE 5, showing one of the supports for the conveyor, and the postion occupied by the belt runs on the carrier member of the conveyor;

FIGURE 8 is a sectional elevation along line 8—8 of FIGURE 5 showing the positions occupied by the belt runs as they make the turn, and showing how the hanger goods are carried around the turn; and FIGURE 9 is a cross section of another conveyor embodying the invention, comprising a tubular carrier member and belt of different cross sectional configurations than those of the other embodiments shown.

The conveyor illustrated in FIGURES 1, 2 and 3 comprises a rigid, tubular carrier member 1, which slidably supports and guides the runs of an endless belt 2. The carrier member is generally horizontal in the sense that it is not upright, and is supported by brackets 3 from a building. The conveyor belt 2 supports hanger goods 5 each comprising a garment hanger 6 which has a hook 7 by which the hanger is hung on the conveyor and which is adapted to suspend a garment 8.

The carrier member 1 shown has on the exterior of its upper portion a surface which supports the upper run of the belt and means which guides the belt so it can travel longitudinally along the carrier member 1; preferably, the belt-supporting surface is a flat, smooth surface 12 and the guiding means is a raised shoulder 13 formed at each longitudinal side of the surface 12 to define a shallow channel 14. The carrier member 1 preferably is a seamless tubular member having an upper wall portion 15 shaped to form the channel 14, surface 12, and guiding shoulders 13.

The upper or load-carrying run 16 of the belt 2 is slidably supported in such channel 14 for guided movement longitudinally of the carrier member 1 in the direction of travel of the load being conveyed. The lower or return run 17 of the belt travels through an opening 18 extending longitudinally through the interior of the carrier member 1 below its upper wall portion 15; the lower belt run 17 is slidably supported by the channel-shaped lower wall portion 19 of the carrier member 1 for guided movement longitudinally of the carrier member in the direction of travel opposite to the direction of travel of the upper run 16. The thickness of the belt 2 which determines the height of the top surface of the upper belt run 16 above the upper belt-supporting surface 12 of the carrier member 1, and the cross sectional size and shape of the carrier member 1 are such as to permit the hooks 7 of the conventional wire garment hangers 6 to clear the carrier member 1 and to contact only the top surface of the upper run 16 of the belt, as shown in FIGURE 3.

Carrier member 1 preferably is made of as many tubular sections 11 as are required to produce the desired length, all of these sections being of identical cross section and joined end to end with their cross sections aligned to provide a smooth and unobstructed slidable support for each run of the belt 2. While various means may be employed to join the sections 11, those shown are the brackets 3 which also support the member 1. Each of these brackets comprises a channel-shaped lower member 21 adapted to fit closely and support the exterior of the lower wall portion 19 of the carrier member 1, and an upwardly extending supporting member 22 fixed to the member 21. This support member is formed as shown with a laterally displaced portion to clear the hooks 7 of the garment hangers 6. The illustrated channel-shaped bottom member 21 is soldered or brazed to the lower walls 19 of the adjoining sections 11 of the carrier member 1, although it may be fixed to them by other means. The supporting brackets 3 are mounted at the junctures of adjoining sections 11 and at such other points as are considered necessary for adequate support of the conveyor.

The belt 2 is positively driven from one end of the carrier member 1 by a suitable source of power. That shown in FIGURE 1 comprises a driving sprocket 23 rotated by a motor 24, and an idler pulley 25, the axes of the driving sprocket and the idler pulley being substantially horizontal and located below the upper belt-carrying surface 12 of carrier member 1 so that the top of the driving sprocket carries and guides the upper run of the belt and the top of the idler pulley engages and guides the lower run of the belt while increasing the belt wrap on the driving sprocket. Different arrangements can be employed, such as that shown in FIGURE 4, in which the substantially horizontal axes of the driving sprocket and the idler pulley are located above the belt-carrying surface 12 of member 1 so that the bottom of the driving sprocket engages and guides the lower run of the belt and the idler pulley contacts and guides the upper run of the belt while providing increased belt wrap on the driving sprocket. In each of these illustrated arrangements, the lower run of the belt travels toward the driving sprocket while the upper run of the belt travels away from it; this is usually preferable since the articles carried by the upper run of the belt can then be conveyed away from the power source and toward the undriven end of the conveyor which may be unobstructed as shown to permit the articles to be readily discharged from it.

This advantage is provided by the conveyor of FIGURES 1 and 2 in which the undriven end or end remote from the power source has an idler pulley 26 around which the belt 2 travels from the upper surface 12 of tubular carrier member 1 to the lower opening 18 extending through the carrier member; the idler pulley is rotatably supported by brackets 27 mounted on the end of tubular carrier member 1, and is positioned so that the undriven end of the conveyor is free and unobstructed to permit the hanger goods to be readily discharged from the upper run 16 of the conveyor belt. To receive the goods so discharged, the conveyor of FIGURES 1 and 2 includes a downwardly inclined slide bar 28 one end of which is connected to the end of carrier member 1 carrying pulley 26. Therefore, after the hanger goods have been carried to the undriven end of the conveyor by the upper run 16 of the belt 2, downward movement of the belt over the idler pulley 26 causes the hooks 7 of the hangers 6 to discharge from the belt onto the inclined slide bar 28, along which goods move by gravity away from the conveyor. Of course, the pulley 26 at the unobstructed end of the conveyor may be positively rotated by a suitable source of power to aid in driving the belt, as may be desirable when the belt is heavily loaded due to upward travel of the conveyor, substantial length of conveyor, heavy goods loads, or other reasons; in such case the drive shaft for the pulley 26 should extend to the power source only on the side of the conveyor at which project the supporting members 22 of the brackets 13, to permit the end of the conveyor carrying pulley 26 to be unobstructed for the carrying and discharge of the hooks 6 by the upper run 16 of the belt.

The goods may be placed on the conveyor manually, or by automatic means. The conveyor illustrated in FIGURES 1 and 2 includes an inclined supply member 31 down which the hanger goods 5 may slide by gravity from a suitable source such as a storage rack. The hooks 7 of the hangers 6 slide off the lower end of member 31 onto upper run 16 of the moving belt 2, which conveys them to the point at which they are removed from the conveyor. Preferably the supply member 31 is downwardly inclined toward the conveyor from the side of the conveyor, so that only the hanger hooks 7 contact the member 31 and the belt run 16, and the garments 8 cannot contact the conveyor. Such a supply member 31 may be located at one or more suitable points along the length of the conveyor; the lower end of member 31 may either be fixed to the conveyor as shown, or may be movable so it only discharges hanger goods onto the conveyor when the lower end is moved into the vicinity of the conveyor belt.

The conveyor need not be a straight line conveyor; portions of it may be offset or located at different levels and joined by an inclined portion, as shown in FIGURE 1. When the change in direction of the conveyor is such that the upper belt-supporting surface 12 of the carrier member 1 is convexly curved, as at 32 in FIGURE 1, the upper run 16 of the belt follows the surface 12 whether or not it is carrying goods. When the upper belt-carrying surface 12 is concavely curved, as indicated at 33 in FIGURE 1, suitable means preferably is provided to hold down the upper run 16 of the belt on or near the surface 12 in the vicinity of the bend, while permitting the hooks of the hangers to pass under such hold-down means. Preferably, a rotatable roller or pulley 34 is provided for this purpose, as shown in FIGURES 1 and 2; this pulley bears against and moves at the same speed as the upper surface of the upper run 16 of the belt 2. The belt has sufficient elasticity to permit hooks 7 of the hangers 6 to pass between the belt and the underside of roller 34. While in this embodiment the roller 34 is mounted for free rotation about a fixed axis, the roller may be positively rotated; and whether freely rotatable or positively rotated it may be movably supported so it can retract as the hanger hooks 7 pass under it. No problem is encountered with the lower run 17 in either case, since it is guided by the surrounding walls of the tubular carrier member.

Conveyors embodying the invention can also operate efficiently and effectively to support and transport the hanger goods even though the belt changes direction substantially in the plane of travel of the goods. FIGURES 5 to 8, inclusive, show such a conveyor in which the upper load-carrying run 16 of the belt 2 passes from one tubular carrier member 1, around a portion of the circumference of a pulley or sheave 35 mounted for rotation about a substantially vertical axis, to another tubular carrier member 36 disposed at an angle to member 1, the belt-carrying surfaces 12 of both carrier members 1 and 36 lying in the same substantially horizontal plane. Member 36 has the same cross section as the previously described cross section of member 1. As is apparent from FIGURE 8, the pulley 35 has a circumferential recess 37 shaped to engage, support and guide the belt 2, and spaced recesses 38 which extend generally radially and axially of the pulley 35 at its outer edge to interrupt the recess 37, and provide clearance for the hooks 7 of the hangers 6 between the belt 2 and the pulley 35. Preferably the pulley 35 is designed and mounted so it tangentially engages the belt run 16 as it leaves member 1 and as it passes to member 36, as shown in FIGURE 5. Desirably, the pulley 35 is freely rotatably mounted about a fixed vertical axis, as shown; however, it may be resiliently mounted so as to move laterally to maintain tension in the belt, and it also may be power-driven if desired. Preferably, a curved track or guide member 39 extends around the pulley 35 between the outer sides of the carrier members 1 and 36 to slidably support the hooks 7 of the hangers 6 as they move from member 1 to member 36. The track member 39 is shaped and positioned so that after the hooks 7 of hanger 6 have been carried by the upper run 16 of the belt 2 along carrier member 1 to the vicinity of the pulley 35, an upwardly inclined portion 41 of the top edge of member 39 slidably engages the hooks and lifts them above the belt run 16, a curved horizontally extending top edge portion 42 of member 39 slidably supports the hooks 7 as they are moved around the portion of the circumference of the pulley 35 carrying the belt by contact with the sides of the pulley recesses 38 until the hooks reach the carrier member 36, and a downwardly inclined top edge portion 43 of member 39 slidably deposits the hooks 7 on the upper belt run 16 passing along member 36 away from pulley 35.

Another pulley 44 is provided to support and guide the lower run 17 of the belt 2 as it changes direction of travel and passes from the interior of tubular carrier member 36 to the interior of tubular carrier member 1. This pulley 44 has a circumferential recess 45 but no transverse recesses, since none are required; it is preferably mounted for free rotation about a fixed vertical axis, coincident with that of pulley 35, although it may be resiliently mounted for lateral movement or may be power driven.

In this embodiment, as in those previously described, the belt 2 shown is a "V-belt" having a trapezoidal cross section; the upper belt run 16 travels along the upper channel 14 with its narrow side down and in contact with the upper surfaces 12, and the lower belt run 17 travels with its wider side down and in contact with the bottom wall 19 of the tubular carrier members. In the conveyor of FIGURES 5 to 8, inclusive, the circumferential recesses of the pulleys 35 and 44 have outwardly flared sides to engage the slanted sides of the belt for efficient support and contact. Therefore, the belt twists about a quarter of a turn as it starts on each pulley 35 and 44 as shown in FIGURES 5 and 6, and untwists when it leaves such pulley; this temporary twisting in no way impairs the operation of the conveyor. Although in the conveyor illustrated in these figures, the upper and lower belt runs turn through an angle of about 90° in a horizontal plane, the angle may be either less or greater than 90° and may even approach or exceed 180°.

The belts illustrated in FIGURES 1 to 8, inclusive, are conventional V-belts of trapezoidal cross section made of rubber type material reinforced with impregnated fabric; they may be used for extremely long periods without replacement, since they are exposed to very little wearing action. Belts formed of other materials and having other cross sections, and carrier members of shapes other than heretofore described, may be employed. For example, the belts may be of rectangular, oval or circular cross sections. Thus FIGURE 9 shows a cross section of a conveyor comprising a belt 46 of circular cross section and a tubular carrier member 47, the upper run 48 of the belt being slidably supported for guided movement in a channel 49 formed in the upper part of the member 47, and the lower run 51 of the belt being slidably supported and guided in the opening 52 extending longitudinally through the tubular member 47. The channel 49 has a substantially semi-circular cross section to support and guide the circular cross sectioned belt run 48. A belt of this cross section need not twist in passing over the pulleys of an arrangement such as that shown in FIGURES 5 and 6. The surface of any belt which forms the upper surface of the upper run of a conveyor embodying the invention may be transversely ridged, serrated or otherwise provided with means for increasing the friction or grip between the goods and the belt to aid in moving the goods, although the relatively smooth surfaces of the belts shown in the drawings are satisfactory for most purposes.

The present invention thus provides conveyors meeting all of the stringent requirements described above which are imposed by service involving the handling of hanger goods. As is apparent from the above description of several embodiments of the invention, conveyors embodying the invention can be made and installed which will not soil the garments being conveyed, which can be loaded and unloaded quickly, easily and economically by hand or automatically, which can travel in any direction likely to be encountered in service, which can be made in long lengths, which can be made of light but strong construction and be readily and economically manufactured and installed, which can carry substantial loads, which can have long service life with a minimum of maintenance, which require no belt lubrication, and which have low power requirements when not under load or when under load.

While the present invention has been discussed in connection with the conveyance of hanger goods, it is apparent that conveyors embodying the invention may be used, either singly or in combination, for the conveyance of other goods or articles, including those which may be moved by other types of hook means carried by the upper run of the belt, or those which may be supported directly on the top surface of the upper belt run of one or more conveyors embodying the invention.

The conveyors illustrated as embodying the invention also possess the important advantage that both the load-carrying run and the return run of the belt are closely positioned relatively to each other and are slidably supported by a common, compact carrier member. Therefore, there are no problems of providing for the return belt run any supporting means or space for such supporting means separate from the carrier member which supports the load-carrying belt run. Consequently, both runs of the conveyor belt, the carrier member supporting them, and the supports for the carrier member can be made to fit in space of small cross section, which is generally advantageous and provides special benefits in complex goods or article handling systems where space is limited. The fact that conveyors embodying the invention require relatively no maintenance and create no dirt or dust from lubrication or other causes also makes such conveyors particularly beneficial for such applications.

It will further be appreciated that the present invention may be embodied in conveyors of different types than those specifically disclosed herein which are given by way of example only. The essential characteristics of the invention are set forth in the appended claim.

I claim:

A conveyor comprising two elongated tubular carrier members, each of said carrier members having a closed tubular wall the upper wall portion of which defines a continuous longitudinally extending external upwardly facing belt-supporting surface and a continuous longitudinally extending shoulder adjacent to and extending transversely of said upwardly facing belt-supporting surface for guiding a belt longitudinally of said carrier member, the lower wall portion of said carrier member defining an internal upwardly open channel located below said external channel and extending longitudinally of and within said tubular carrier member, said internal channel having a continuous upwardly facing belt-supporting surface, said tubular carrier members being disposed in spaced relation at an angle to each other with their upwardly facing belt-carrying surfaces substantially in a common plane and with one end of each of said carrier members adjacent one end of the other; a single, narrow, thick endless belt supported by both of said carrier members with its upper run slidably carried by said belt-supporting surfaces of both said tubular carrier members with the top surface of said upper belt run projecting above the shoulders of said tubular carrier members and with the upper run of said belt being guided longitudinally of said carrier members solely by sliding engagement of said belt run with said external channels of said carrier members, and with its lower run passing through both said tubular carrier members and slidably carried in guided relation on said belt-supporting surfaces of said internal channels thereof; and separate guide means disposed between said adjacent ends of said tubular carrier members to support and guide the upper run of said belt, the lower run of the belt, and the load carried by the upper run of the belt passing between said external belt-supporting surfaces of said carrier members; said belt is a V-belt of trapezoidal cross section the maximum thickness dimension of which is a major portion of its maximum width dimension, said V-belt being slidably supported on its narrower surface in said external channels of said carrier members and on its wider surface in said internal channels of said carrier members; and in which said guide means comprises a rotatable pulley disposed between said adjacent ends of said tubular carrier members and having a circumferential groove of V-shaped cross section in which the upper run of said belt passing between said external channels of said carrier members travels with its narrower surface facing the bottom of said groove and also having a plurality of recesses extending transversely of said pulley between said belt and said pulley, and a guide member extending between said adjacent ends of said tubular carrier members in close proximity to the circumference of said pulley, whereby a load-carrying hook which is hooked over the upper surface of said upper run of said belt and moved thereby toward said pulley engages and is slidably moved along said guide member from one tubular carrier member to the other while the free end of said hook is disposed in and moved by one of said transversely extending recesses of said pulley.

References Cited in the file of this patent

UNITED STATES PATENTS

| 1,453,610 | Thornton | May 1, 1923 |
| 1,781,750 | Dodge | Nov. 18, 1930 |
| 2,455,175 | Hohl | Nov. 30, 1948 |
| 2,523,829 | Hubbell | Sept. 26, 1950 |
| 2,846,049 | Carlson | Aug. 5, 1958 |
| 2,953,930 | Meyer | Sept. 27, 1960 |
| 2,985,000 | Werner | May 23, 1961 |
| 2,987,170 | Hamilton | June 6, 1961 |

FOREIGN PATENTS

| 115 | Great Britain | Jan. 2, 1904 |